Jan. 3, 1928.

F. N. KOLBERG 1,654,590

CONVEYER AND SIFTING SCREEN APPARATUS

Filed May 27, 1927  2 Sheets-Sheet 1

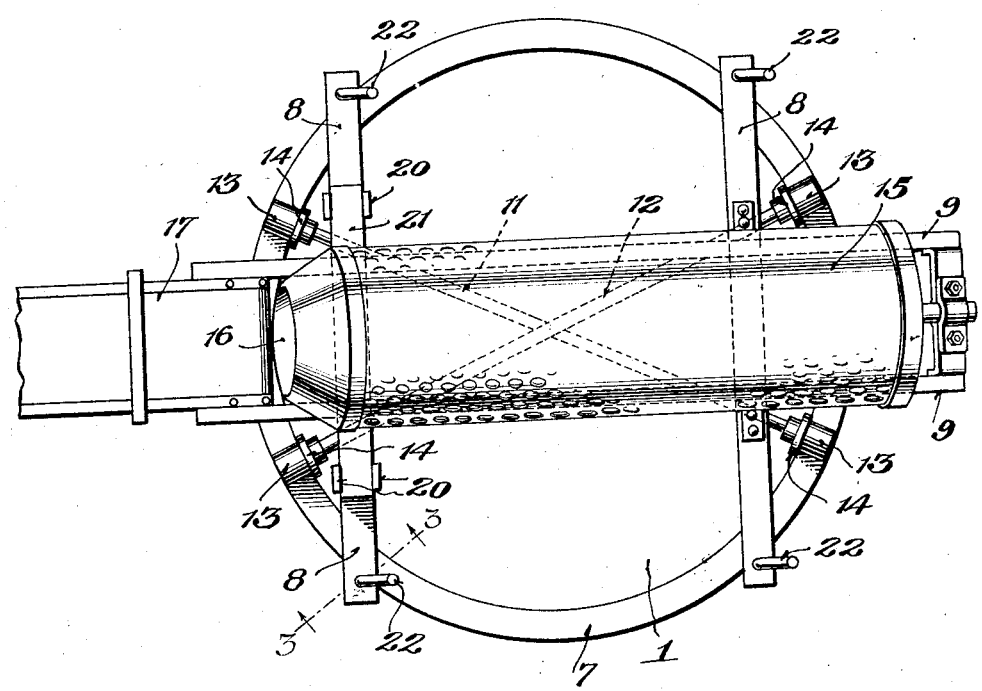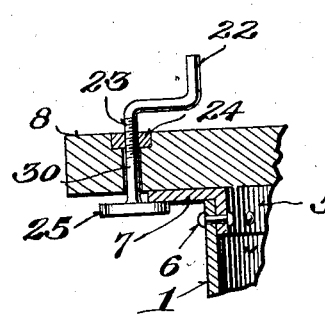

Patented Jan. 3, 1928.

1,654,590

UNITED STATES PATENT OFFICE.

FRITHJOF N. KOLBERG, OF SPENCER, SOUTH DAKOTA.

CONVEYER AND SIFTING-SCREEN APPARATUS.

Application filed May 27, 1927. Serial No. 194,781.

This invention relates to certain new and useful improvements in conveyer and sifting screen apparatus, and relates more particularly to an apparatus for use in gravel and sand pits.

The primary object of the invention is to provide an apparatus of this kind wherein a rotary or other sifting screen itself has rotary movement on a turn-table or the like carried by the top of a hopper, the sifting screen being connected to the discharge end of a conveyer, whereby the screen and therewith the conveyer may be disposed at any point throughout the entire circumference of the hopper so as to convey material from any desired point to the screen, whereupon the latter will sift the material and discharge same into the hopper and from the latter into the pit.

The invention further aims to provide novel means for latching the screen and therewith the conveyer against movement about the circumference of the hopper.

In the drawings:—

Fig. 2 is a top plan view, and

Fig. 3 is an enlarged section on line 3—3 of Fig. 2 showing the latching means.

Figure 1:
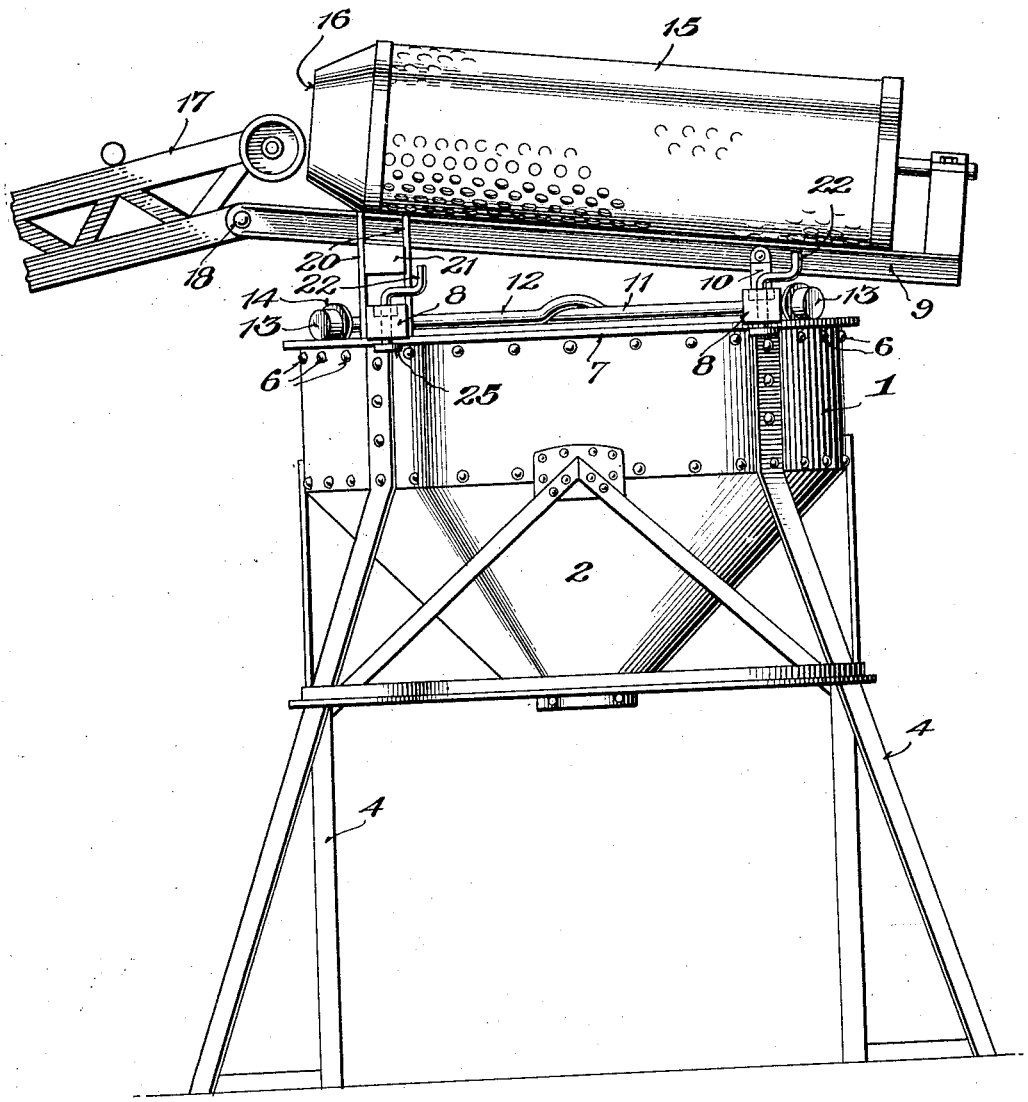
Fig. 1 is a side elevation of the invention, the conveyer being shown broken away.

In proceeding in accordance with the present invention, a hopper 1 is employed having a discharge end 2, the hopper being mounted upon struts or legs 4 so as to occupy an elevated position in the pit. A ring-like turn-table composed of angle iron has its depending or vertical web 5 projecting within the hopper at the top of the latter and is secured thereto by rivets 6 or the like. The horizontal web 7 of the angle iron extends outwardly from the hopper and forms a track for a carriage now to be described. The carriage is composed of spaced parallel bars 8 which extend transversely across the turn-table and which are secured to a screen carrying frame 9 by means of supporting bars 10 and 20. The bars 20 are secured to a bar 21 which latter underlies the frame 9 and supports the latter at an incline. The bars 8 are transversely perforated and receive therethrough the end portions of a pair of cross shafts 11 and 12, the shaft 12 being bowed at its center at 13 and extending over the center of the shaft 11 so that the two shafts occupy the same plane. Rollers 13 having flanges 14 are provided on the ends of the shafts, the rollers riding on the track 7 and the flanges thereof engaging the webs 5 of the turn-table, thereby to prevent the carriage from moving horizontally off the turn-table.

A preferably rotary screen 15 is carried by the flange 9 and has its inlet 16 disposed adjacent to the discharge end of a conveyer 17, the latter being pivoted at 18 to the frame 9 so that the conveyer will partake of all of the rotary movements of the screen 15 circumferentially of the hopper.

For the purpose of latching the carriage to the turn-table, each of the bars 8 is provided with a crank shaft 21, the latter having a hand crank 22 on its upper end and being threaded at 23. The threaded portion 23 engages in a nut 24 carried by each bar. The lower end of each shaft is equipped with a clamping disk 25, which latter engages the under face of the horizontal track 7 of the turn-table. It will be noted that each of the bars 8 is disposed adjacent to the upper face of the track 7 whereby upon rotation of the crank shafts 30, the disks 25 will engage the under faces of the track 7 and thereby clamp the bars 8 of the carriage thereto.

In operation the carriage is rotated to bring the conveyer to the point of location of the material, whereupon the carriage is latched to the turn-table and the material carried by the conveyer to the screen 15, the latter sifting the material and discharging same into the hopper. It will thus be seen that the material can be easily and quickly carried to the screen and from the same discharged into the hopper at any point throughout the entire circumference of the hopper.

What is claimed is:—

1. In combination with a hopper, a ring-like turn-table, secured to the top of the hopper with its open center in register with the hopper interior, a carriage composed of transverse bars and a pair of crossed shafts having flanged rollers journaled on their ends mounted on the turn-table and secured to the bars, a frame disposed at an incline above the carriage, a sifter screen on the frame having a conveyer connected to its inlet, means to secure the frame to the bars, and means to latch the carriage to the turn-table.

2. In combination with a hopper, a turn-table secured to the hopper, a carriage rotatable on the turn-table, means to latch the carriage to the turn-table against rotation relative thereto, a sifter screen on the carriage movable therewith and arranged in inclined position over the hopper, and a conveyer connected to the screen inlet to partake of the rotary movements of the turn-table.

3. In combination with a hopper, a turn-table connected to the hopper, a rotary carriage on the turn-table, a sifting screen connected to the carriage and movable therewith and discharging into the hopper, and a conveyor having its discharge end connected to the screen so as to partake of the movements of the screen and carriage.

4. In combination with a hopper, a turn-table connected to the hopper, a rotary carriage on the turn-table, a sifting screen connected to the carriage and movable therewith and discharging into the hopper, a conveyer having its discharge end connected to the screen so as to partake of the movements of the screen and carriage, and means to latch the carriage to the turn-table.

5. In combination with a hopper, a ring-like angle iron turn-table secured to and about the upper end of the hopper, a carriage having rollers engaged with the turn-table, a screen on the carriage arranged to discharge into the hopper, a conveyor having its discharge end connected to the screen, and means to latch the carriage to the turn-table including devices engageable with the under face of the horizontal part of the turn-table so as to clamp the carriage to the upper face of the said horizontal part of the turn-table.

6. In combination with a hopper, a turn-table secured to the top of the hopper, a carriage including transverse bars and crossed diametrical shafts extending through the bars, rollers on the shafts engaging the turn-table, a sifting screen on the carriage having the discharge end of a conveyer secured thereto, and means to clamp the bars to and against the upper face of the turn-table so as to prevent movement of the carriage on the turn-table.

7. In combination with a hopper, a turn-table secured to the top of the hopper, a carriage including bars engageable with the upper face of the turn-table, means to clamp the bars to the upper face of the turn-table, and a sifting screen having the discharge end of a conveyer connected thereto on the carriage.

In testimony whereof I affix my signature.

FRITHJOF N. KOLBERG.